United States Patent [19]
Chen

[11] Patent Number: 5,440,944
[45] Date of Patent: Aug. 15, 1995

[54] SAFETY POWER WINDOW MECHANISM FOR ALL TYPES OF AUTOMOBILE

[76] Inventor: Tse-Hsing Chen, No. 22, Lane 351, Di Hwa Street, Taipei, Taiwan

[21] Appl. No.: 87,270

[22] Filed: Jul. 8, 1993

[51] Int. Cl.⁶ .................. F16H 27/02; G05G 1/08
[52] U.S. Cl. ..................... 74/89.21; 74/505; 74/506; 474/148; 474/154
[58] Field of Search ............. 74/89.21, 505, 506, 74/507; 474/148, 154, 149, 150

[56] References Cited

U.S. PATENT DOCUMENTS

| | | | |
|---|---|---|---|
| 4,445,604 | 5/1984 | Rogers | 74/89.21 |
| 4,503,722 | 3/1985 | Suzuki et al. | 74/89.21 |
| 4,592,245 | 6/1986 | Pickles | 74/89.21 |
| 4,767,386 | 8/1988 | Spaggiari | 474/148 |
| 4,842,233 | 6/1989 | Rusin | 74/89.21 X |
| 4,865,516 | 9/1989 | Focke et al. | 74/89.21 X |
| 4,962,847 | 10/1990 | Pisors et al. | 474/154 X |
| 5,006,097 | 4/1991 | Cook | 474/154 |
| 5,140,760 | 8/1992 | Mannbro | 74/89.21 X |

FOREIGN PATENT DOCUMENTS

| | | | |
|---|---|---|---|
| 0160923 | 11/1985 | European Pat. Off. | 74/89.21 |
| 2251047 | 6/1992 | United Kingdom | 74/89.21 |

*Primary Examiner*—Vinh T. Luong
*Attorney, Agent, or Firm*—Bacon & Thomas

[57] ABSTRACT

A power window mechanism designed to be retrofitted onto the crankshaft of a conventional handcrank operated window opening and closing mechanism includes a motor, a rack with ball-type cogs driven by the motor, a gear driven by the rack, a transmission gear driven by the driven gear, and a separate conversion gear having a central hole shaped to fit onto the shaft and whereby transmit power from the motor to the shaft. The position of the motor is detected by a sensor which generates pulse generated in response to turning of the motor, without the need for an electrical input. The control circuit itself is provided with a processor capable of counting the pulses and controlling the operation of the motor, including its direction, in response to the pulses.

5 Claims, 7 Drawing Sheets

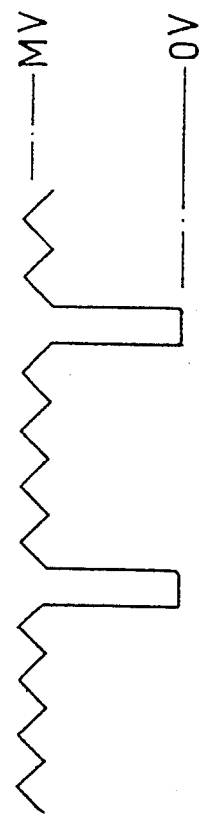
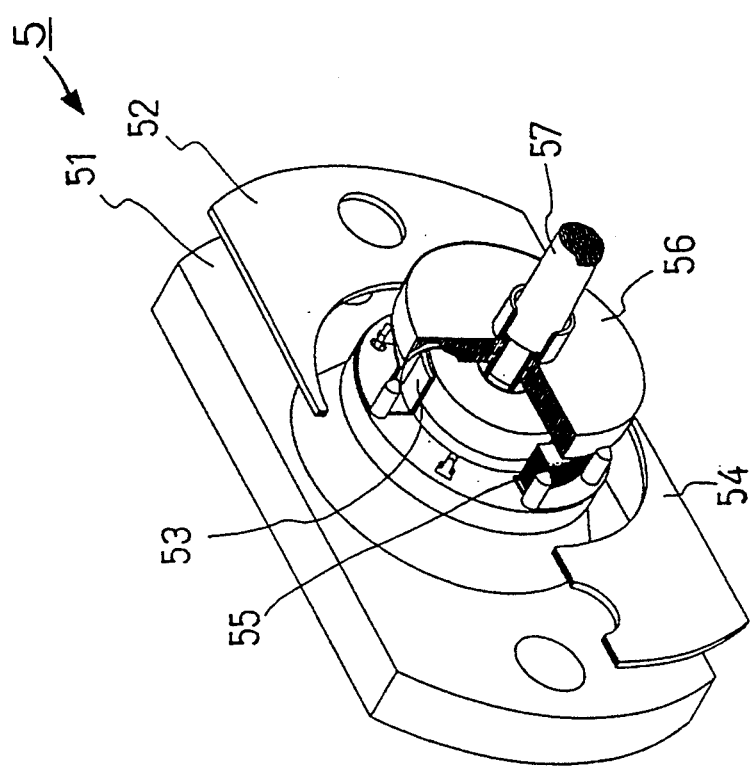
FIG.4(B)
FIG.4(A)

ered by the upward moving window glass, very serious injury or even asphyxia might still result since there is no way to free the child. In most conditions, a panicked child will not know how to lower down the window glass and the consequence is just unimaginable.

The above problems led applicant to develop a safety power window mechanism for all types of automobile to eliminate the drawbacks of conventional power window mechanisms for cars.

SUMMARY OF THE INVENTION

A primary object of the present invention is to provide a power window mechanism for cars in which a conversion gear available in many different specifications of coupling hole is provided to simplify the method of conversion of a manually-operated car window into a power window.

Another object of the present invention is to provide a power window mechanism for cars in which a rack with ball-type cogs is provided as the transmission means to avoid the problems of poor engagement of the cogs with teeth on a gear or of cogs breaking under pressure, which frequently happens in a rack with square or trapezoid cogs, allowing the power window to be more practical and reliable in use.

A further object of the present invention is to provide a power window mechanism for cars in which a power-free sensor is adopted as the sensing control means and which, along with a control circuit, provides a reversible power window which is safer in use and can be precisely controlled.

BRIEF DESCRIPTION OF THE DRAWINGS

The structure, features, and other objects of the present invention as well as the technical means adopted to achieve the function of the present invention may be best understood from the following detailed description of the preferred embodiment and the accompanying drawings, wherein

FIG. 4A is a perspective of the sensor adopted in the present invention, and FIG. 4B is a diagram showing the electric wave signal sent by the sensor of the present invention;

DETAILED DESCRIPTION OF THE PREFERRED EMBODIMENTS

Figure 2:
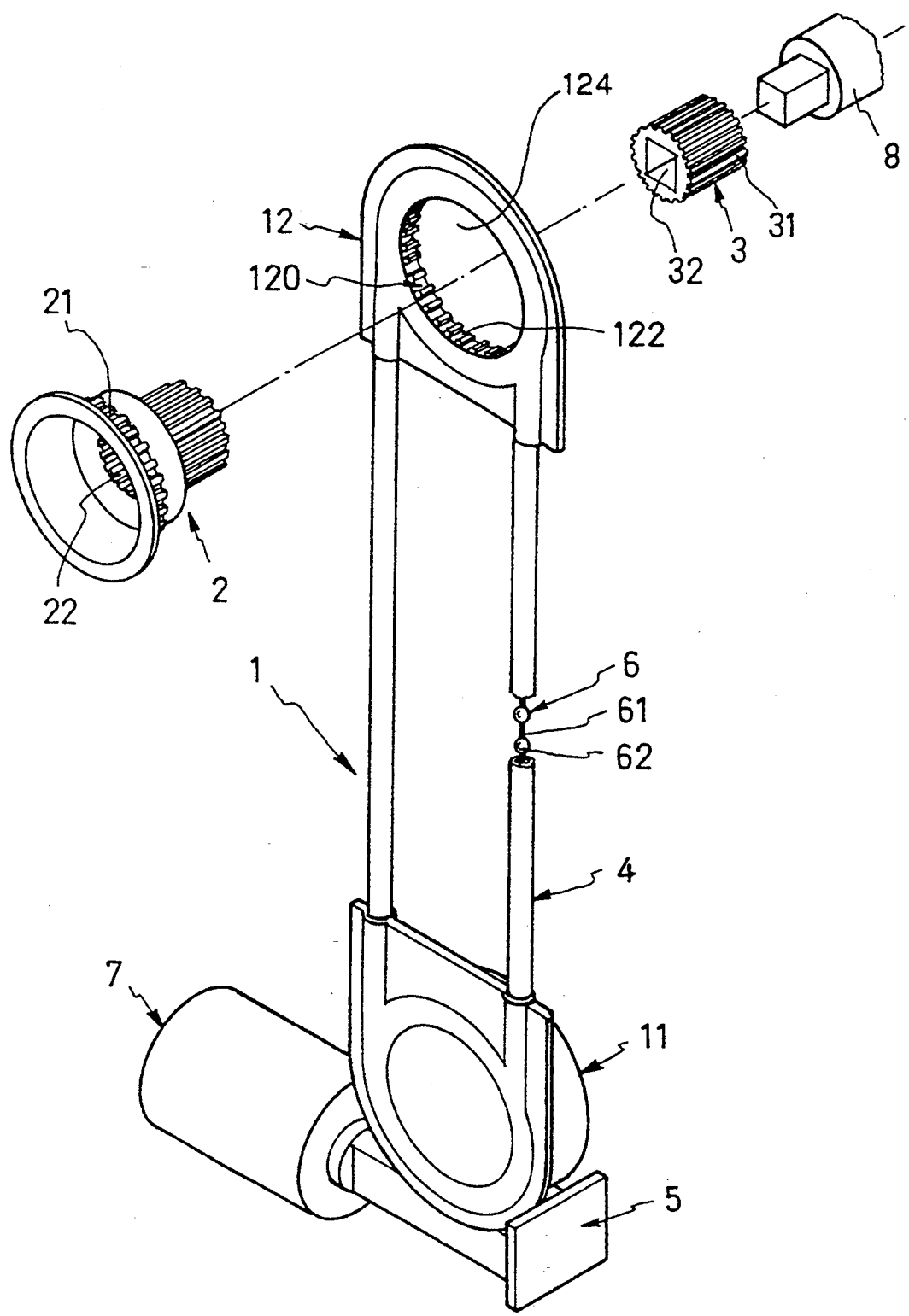
FIG. 2 is a partially disassembled perspective of the present invention.

Referring to FIG. 2, a safety power window mechanism for all types of automobile according to a preferred embodiment of the present invention includes a transmission mechanism 1, a coupling gear 2 engaging with the transmission mechanism 1 at one end thereof, a conversion gear 3 disposed inside and engaging with the coupling gear 2 for receiving an existing hand crank shaft 8, a power-free sensor 5 provided at the other end of the transmission mechanism 1 opposite to the coupling gear 2, a set of tubular housings 4 disposed between and connecting two ends of the transmission mechanism 1, a rack 6 received in and passing through the tubular housings 4 and engaging with the transmission mechanism 1, and a reversible power window control circuit for controlling the reverse movement of the power window glass.

Figure 1:
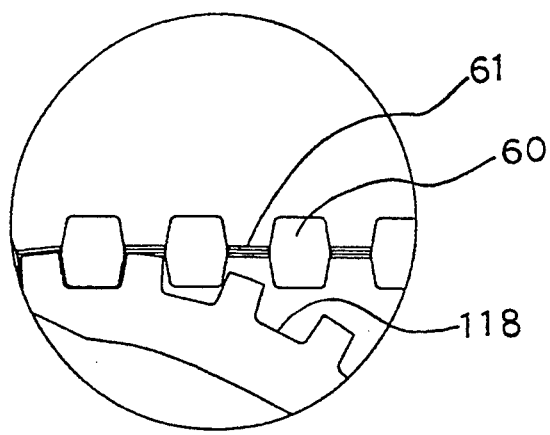
FIG. 1 shows the transmission structure of a conventional power window and the cogs and teeth thereof in a larger scale.
Figure 1:
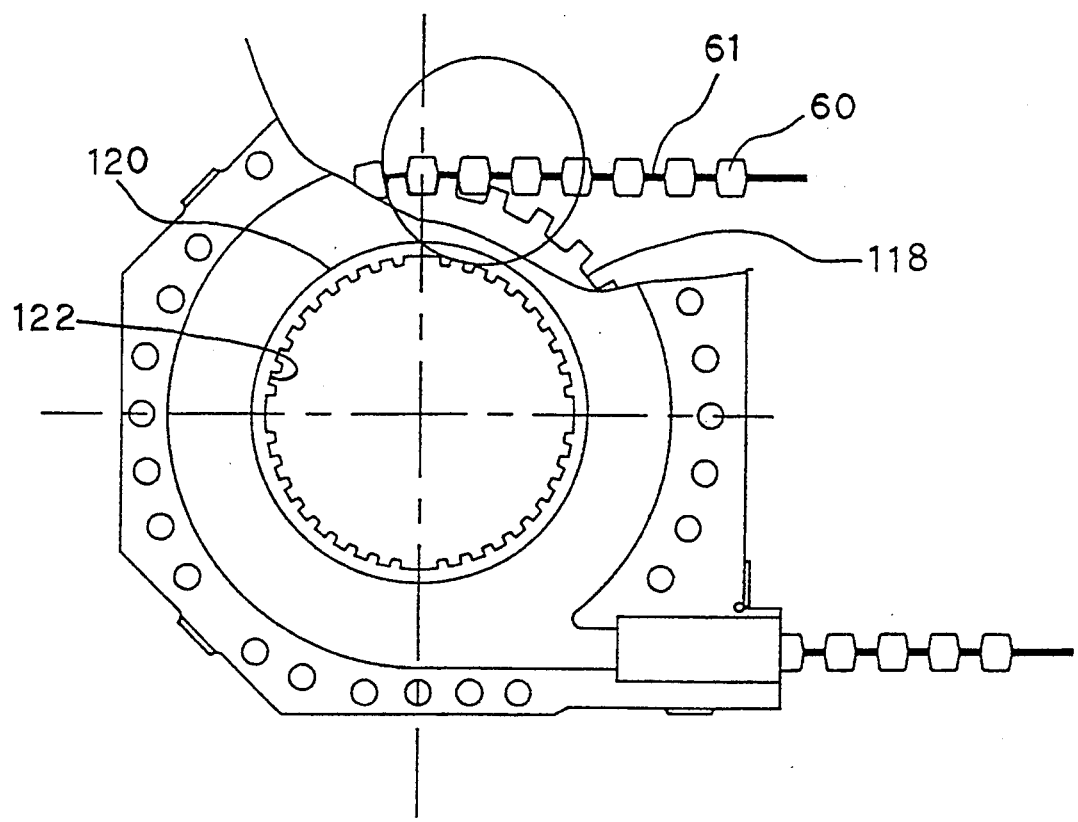
Figure 3:
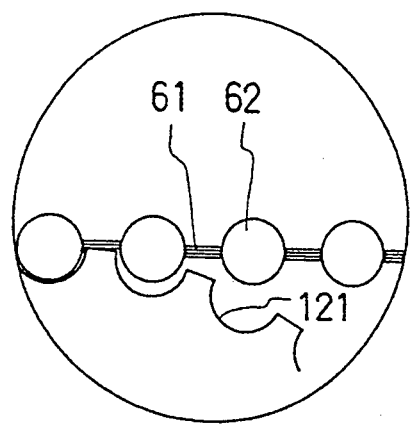
FIG. 3 shows the transmission structure of the power window according to the present invention and the cogs and teeth thereof in a larger scale.
Figure 3:
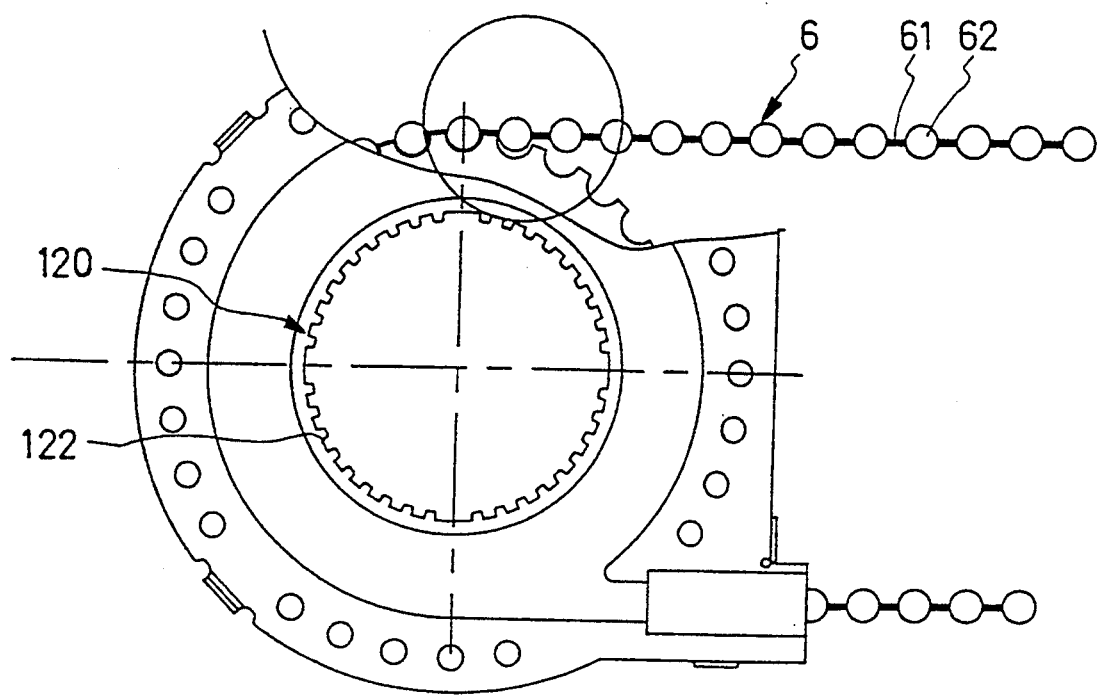

The transmission mechanism 1 further includes a power conversion means 11 and a driven mechanism 12. Axial power from a motor 7 is converted into linear power through the power conversion means 11 and is then transferred to the driven mechanism 12 via the rack 6. Conventionally, as shown in FIG. 1, the rack used to transfer the power would generally have square or trapezoid cogs 60, as shown in FIG. 1. Because the cord 61 of the rack 6 would usually lengthen after long term use the pitch of square or trapezoid cogs of the rack 6 would become accordingly larger. The enlarged pitch of cogs makes the engagement of cogs on the rack 6 with the outer peripheral teeth 121 of a driven gear 120 of the driven mechanism 12 more difficult, and the cogs of the rack 6 tend to slip off the driven gear 120, or clog and break in the outer frame of the driven mechanism 12. In contrast, the rack 6 of the present invention has ball-type cogs 62 as shown in FIG. 3 and the outer peripheral teeth 121 of the driven gear 120 of the driven mechanism 12 have a concave configuration to match with the ball-type cogs 62 of rack 6, allowing the ball cogs 62 to smoothly engage with the concave outer peripheral teeth 121 of the driven gear 120. Even when the cord 61 of the rack 6 lengthens due to long term use, the ball-type cogs 62 may still easily slip into and engage with the concave outer peripheral teeth 121. Moreover, a ball-type cog has smaller contact area and therefore, a lower friction coefficient, which allows the rack 6 to move in the tubular housings 4 and engage with the gears of the transmission mechanism 1 very smoothly.

The driven gear 120 has a central hole 124 which forms an inner gear 122. The coupling gear 2 has a larger diameter portion with a plurality of outer peripheral teeth 21 which engage with teeth of the inner gear 122 of the driven gear 120.

The coupling gear 2 further has a smaller diameter portion having a central hole which forms an inner gear and has a plurality of inner gear teeth 22. The conversion gear 3 has a plurality of outer peripheral teeth 31 and a central hole 32. The conversion gear 3 is disposed inside the smaller diameter portion of the coupling gear 2 with its outer peripheral teeth 31 engage with the inner gear teeth 22 of the coupling gear 2, allowing the power from the motor 7 to be sent to the conversion gear 3 through the rack 6, the driven gear 120 of which the outer peripheral teeth 121 engage with the cogs 62 of the rack 6, and the coupling gear 2 of which the outer peripheral teeth 21 engage with the inner gear teeth 122 of the driven gear 120. The central hole 32 of the conversion gear 3 is used to receive a hand crank shaft 8 of an existing manually-operated car window. To meet different configurations and specifications of the hand crank shaft 8, conversion gear 3 of the present invention are available in differnt shapes of central hole 32. Through use of a conversion gear 3 with a desired central hole 32 to receive the existed hand crank shaft 8, and by engaging the conversion gear 3 with the inner gear teeth 22 of the coupling gear 2, the power from the motor 7 can be applied to raise or lower the window glass.

Figure 5:
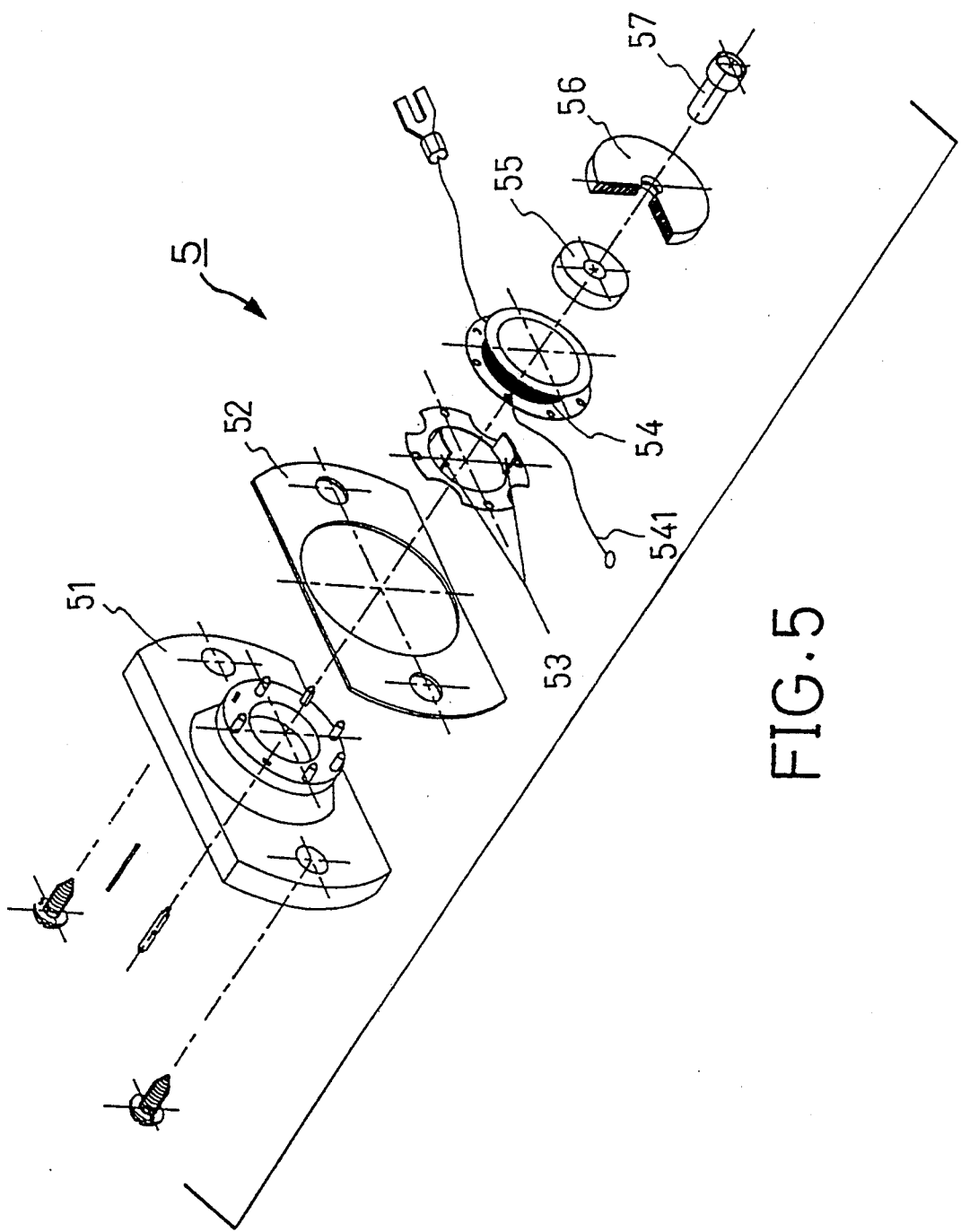
FIG. 5 is a disassembled perspective of the power-free sensor of the present invention.

To control the precise and safe raising and lowering of the window glass, the power-free sensor 5 together with a reversible power window control circuit are used. FIGS. 4A and 5 illustrate the power-free sensor 5. The power-free sensor 5 includes a base 51, a rubber sheet 52, a steel plate 53 with outwardly extended wings 30, an induction coil 54, a magnet 54, a pad 56, and a transmission shaft 57. The transmission shaft 57 is connected to the shaft of the motor 7. The wings of the steel plate 53 extend out of the periphery of the induction coil 54 such that no signal will be produced when the magnet 55 turns in the induction coil 54 and passes the extended wings 58 of the steel plate 53. As a result, each turn of the magnet 55 in the induction coil 54 will produce two no-voltage pulse signals on the electric wave signal curve, as shown in FIG. 4B. By counting the number of such signals produced, the number of circles the motor 7 has turned can be precisely determined, the total travel the window glass has raised or lowered can be calculated from the total number of pulse, and the exact location of the window glass on its way up or down can be decided from the accumulated number of pulse.

Figure 6:
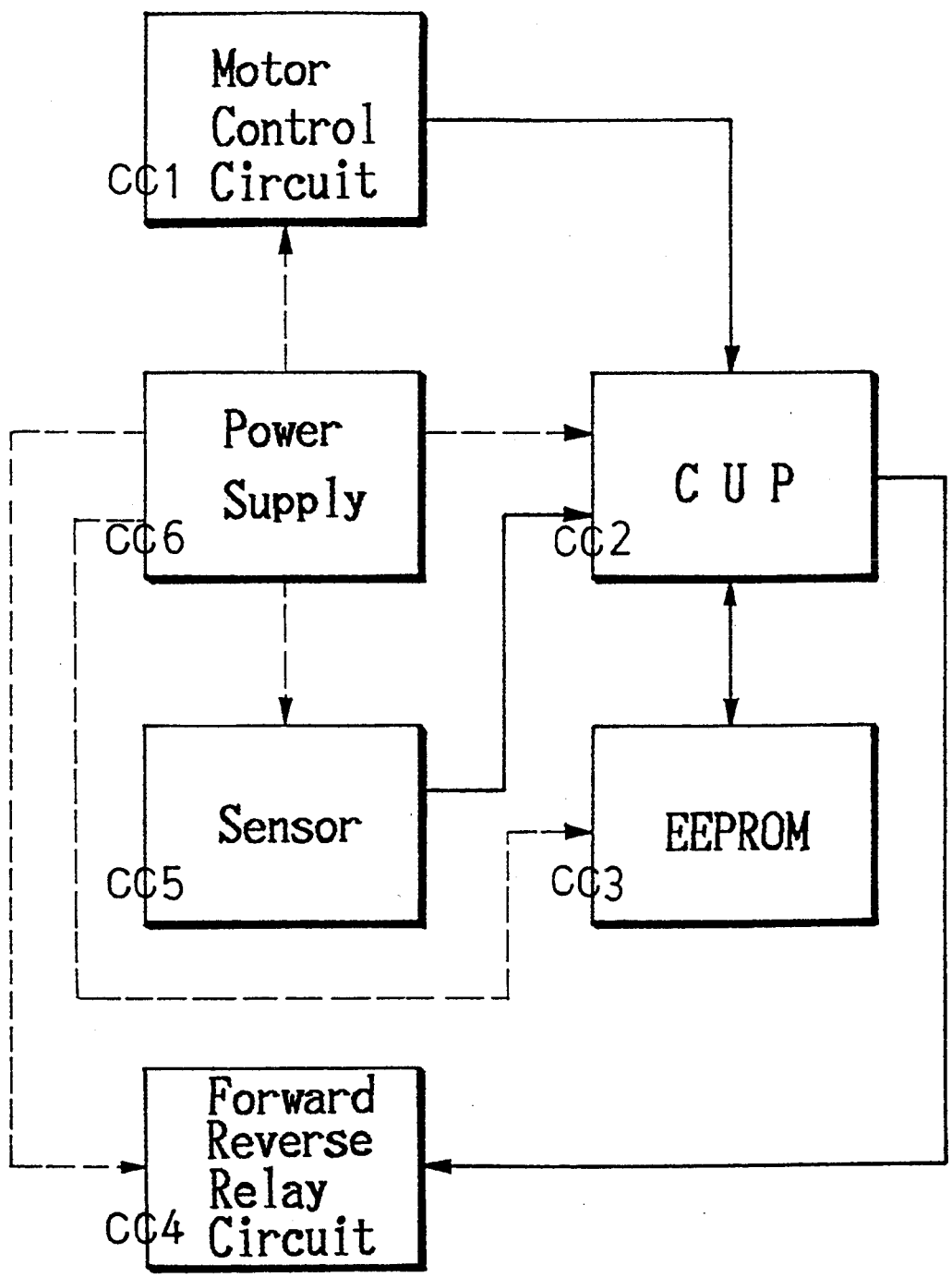
FIG. 6 is a flow chart showing the control circuit of the reversible power window according to the present invention.
Figure 7:
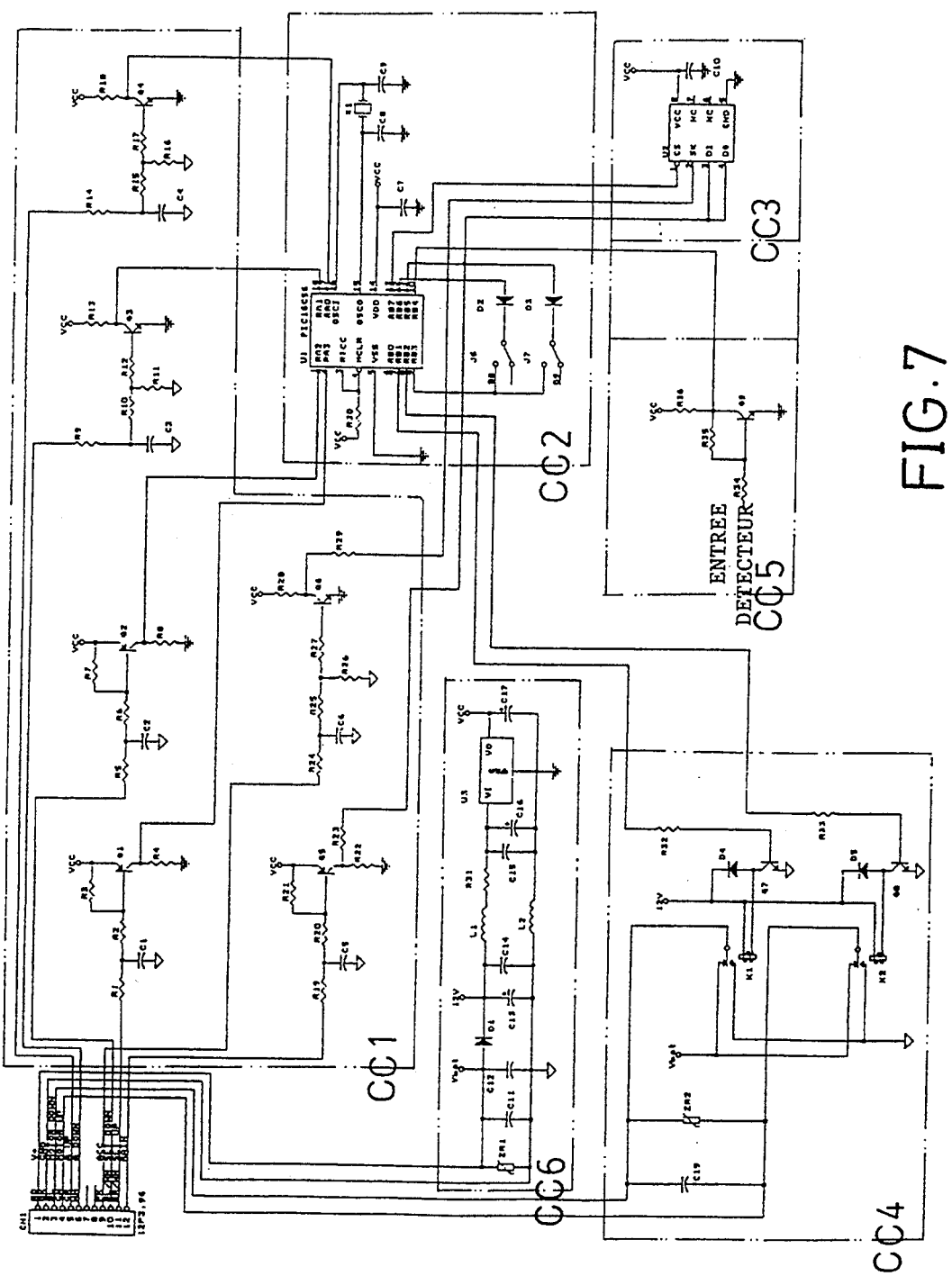
FIG. 7 is the circuit diagram showing the control circuit of the reversible power window of the present invention.

Signals sent out from a signal output terminal 541 of the sensor 5 is sent to the reversible power window control circuit shown in FIG. 7 to be used for window control. The control flow is shown in FIG. 6, which is further explained below:

1. The power-free sensor 5 generates weak pulse signals which are amplified by a signal input interface Q9 in sensor in circuit CC5 and then sent into a central processing unit (CPU) in CPU circuit.
2. The CPU processes the number of pulse signals received by it and counts the number of circles the motor 7 has turned, that is, the amount by which the power window has been raised. The above data are sent to a memory CC3 which protects the data from being erased even when the power is interrupted, that is, the data about the window glass' position and the total travel of the window glass will not be erased from the memory.
3. A close window signal is sent from an open/close input interface to the CPU for processing. In the event an obstacle is encountered by the window glass on its way to a closed position, the CPU will send an auto-reverse signal to a motor control circuit CC1 which causes the window glass to lower. On the other hand, when the window glass reaches the top of window frame, the total number of pulses counted by the CPU is the same as the number of pulses for total travel stored in the memory, and no signal will be sent to lower the window.
4. The ability to cause the power window of the present invention to automatically lower at the time it encounters any obstacle on its way to a closed position is the characteristic of this circuit.
5. Q1, Q2, Q3, Q4, Q5, Q6, and other related circuits are input interface circuits shown in FIG. 7 for opening and closing the windows.
6. In a power supply circuit, ZR1 and C11 are the noise silence circuits, C12 and C13 are the voltage stabilizing capacitors, L1, L2, C14, and C15 are filter circuits, and U3 is the I.C. for transforming high voltage to low voltage.
7. Q9 is the amplifier to amplify the minor signals detected by the sensor 5 and is an interface circuit.
8. K1 and K2 of relay circuit CC4 are the relays for controlling the turning direction of the motor 7, and accordingly the raising and lowering of the window glass. C19 and ZR2 are the circuits to eliminate the sparks and noise from the relays.
9. U1 is the central processing unit (CPU) for processing various kinds of information and doing other operations and judgements. J6 and J7 are for the selection of different functions.
10. U2 is an EEPROM, i.e., an electronically readable and writable memory, which is workable even when the power is interrupted.

From the above description, it can be seen that the power window mechanism of the present invention can positively and effectively solve the problems existing in the conventional power window mechanism, including the difficulty in connecting a conventional power window mechanism to a hand crank shaft of a manually-operated window, a lack of sufficient safety measures, etc. Furthermore, the ball-type cogs adopted in the rack of the present invention have smaller contact areas and therefore, lower friction coefficients, which allows the rack to move smoothly in the tubular housings.

It is to be understood that the form of the invention shown and disclosed is to be taken as a preferred embodiment of the invention and that various changes in the shape, size, and arrangement of parts may be resorted to without departing from the spirit of the invention or the scope of the following claims.

What is claimed is:

1. In a window raising and lowering mechanism for an automobile which includes a hand crank shaft (8), the improvement comprising:
   a conversion gear (3) having a central opening (32) shaped to match that of said shaft and which fits onto the shaft to cause the shaft to rotate in response to rotation of the conversion gear;
   a reversible motor (7);
   a rack (6);
   conversion means (11) tier converting an output motion of said motor into motion of said rack;
   a mechanism (12) driven by the rack; and
   a coupling gear (2) which transmits power from the rack to the conversion gear, wherein:
      said driven mechanism includes a driven gear (120) having a first plurality of concave outer peripheral teeth (121) and said rack includes a cord (61) and ball-type cogs (62) arranged to engage said first plurality of outer peripheral teeth (121) and transmit power from said rack to said driven mechanism even after said cord has lengthened as a result of long term use,
   and further comprising a control circuit (CC1-CC6) for controlling said motor to move said rack, driven mechanism, coupling gear, and conversion gear to rotate said hand crank shaft.

2. A mechanism as claimed in claim 1, wherein:
   said driven mechanism further comprises a plurality of inner peripheral teeth (122),
   said coupling gear has a larger diameter portion, said larger diameter portion including a second plurality of outer peripheral teeth arranged to engage said inner peripheral teeth of said driven gear, and a smaller diameter portion having a central hole (22) which forms an inner gear and has a second plurality of inner peripheral teeth,
   and said conversion gear has a third plurality of outer peripheral teeth which engage said second plurality of inner peripheral teeth.

3. In a window raising and lowering mechanism for an automobile which includes a hand crank shaft (8), the improvement comprising:
   a conversion gear (3) having a central opening (32) shaped to match that of said shaft and which fits onto the shaft to cause the shaft to rotate in response to rotation of the conversion gear;
   a reversible motor (7);
   a rack (6);
   conversion means (11) for converting an output motion of said motor into motion of said rack;
   a mechanism (12) driven by the rack;
   a coupling gear (2) which transmits power from the rack to the conversion gear;
   a control circuit (CC1-CC6) for controlling said motor to move said rack, driven mechanism, coupling gear, and conversion gear to rotate said hand crank shaft, wherein said control circuit includes a sensor input (CC6) arranged to receive input signals indicative of a position of said motor; and
   a sensor (5), wherein said sensor includes:
      a magnet positioned on a shaft of the motor and arranged to rotate therewith;
      an induction coil (54) in which a current is induced in response to rotation of said magnet by said motor; and a plate (53) having wings (58) which extend between said induction coil and said magnet such that as the magnet passes the wings during rotation by the motor, the current induced in said induction coil will periodically drop, resulting in pulsing of the current in the induction coil, the pulses being received by the sensor input means to provide an indication of the output of the position of the motor.

4. A mechanism as claimed in claim 3, further comprising a central processing unit (CC2) for providing a motor control signal to a motor control circuit (CC1), the direction of said motor being controlled by the central processing unit via a relay circuit (CC4), said central proc essing unit being arranged to monitor said pulses and cancel the motor control signal when the motor reaches a position corresponding to that of a closed window, and to cause said motor to reverse direction when an absence of said pulses indicates that the motor is not turning when a motor control signal has been supplied to the motor and the motor position corresponding to the closed window has not been reached, in which case the presence of an obstacle is indicated.

5. A mechanism as claimed in claim 4, further comprising an electronically programmable memory (CC3) for storing data used by the central processing unit to compute a position of the motor, whereby the motor position data is protected in the event of a power failure.

* * * * *